(12) United States Patent
Ratschmann et al.

(10) Patent No.: US 9,857,009 B2
(45) Date of Patent: Jan. 2, 2018

(54) PLUG-IN COUPLING FOR A PIPE, IN PARTICULAR FOR WATER CONDUITS

(71) Applicant: KE KELIT Kunststoffwerk Gesellschaft m.b.H., Linz (AT)

(72) Inventors: Elmar Ratschmann, Hellmonsoedt (AT); Werner Linzner, Weisskirchen (AT)

(73) Assignee: KE KELIT Kunststoffwerk Gesellschaft m.b.H., Linz (AT)

(*) Notice: Subject to any disclaimer, the term of this patent is extended or adjusted under 35 U.S.C. 154(b) by 149 days.

(21) Appl. No.: 14/404,170

(22) PCT Filed: Sep. 9, 2013

(86) PCT No.: PCT/AT2013/050177
§ 371 (c)(1),
(2) Date: Nov. 26, 2014

(87) PCT Pub. No.: WO2014/036587
PCT Pub. Date: Mar. 13, 2014

(65) Prior Publication Data
US 2015/0137515 A1    May 21, 2015

(30) Foreign Application Priority Data
Sep. 10, 2012 (AT) .............................. A 50371/2012

(51) Int. Cl.
*F16L 37/00* (2006.01)
*F16L 37/091* (2006.01)

(52) U.S. Cl.
CPC ......... *F16L 37/091* (2013.01); *F16L 2201/80* (2013.01)

(58) Field of Classification Search
CPC ...................................................... F16L 37/091
(Continued)

(56) References Cited

U.S. PATENT DOCUMENTS

| 4,123,090 A | 10/1978 | Kotsakis et al. |
| 6,427,309 B1 | 8/2002 | Viegener |
| 2004/0245766 A1* | 12/2004 | Vallee ................. F16L 37/0915 285/39 |

FOREIGN PATENT DOCUMENTS

| AU | 567 157 B2 | 10/1984 |
| DE | 103 21 301 B3 | 9/2004 |

(Continued)

OTHER PUBLICATIONS

International Search Report of PCT/AT2013/050177, dated Feb. 5, 2014.

*Primary Examiner* — Aaron Dunwoody
*Assistant Examiner* — Fannie Kee
(74) *Attorney, Agent, or Firm* — Collard & Roe, P.C.

(57) ABSTRACT

A plug-in coupling for a pipe, especially for water conduits, includes a coupling sleeve receiving the pipe end, includes a sealing ring which is inserted into the coupling sleeve, and includes a locking ring which is mounted upstream of the sealing ring in the plug-in direction of the pipe end and forms retaining claws which protrude with respect to the pipe end and are inclined in the plug-in direction. The plug-in coupling also includes an annular body which is similarly mounted upstream of the sealing ring and is supported axially in the plug-in direction in relation to the coupling sleeve. The annular body includes a protective ring for surrounding the face end of the pipe end from the outside, which protective ring is connected via a predetermined breaking connection.

6 Claims, 3 Drawing Sheets

(58) Field of Classification Search
USPC .......... 285/339–340, 342, 3–4, 321, 345
See application file for complete search history.

(56) References Cited

FOREIGN PATENT DOCUMENTS

| | | |
|---|---|---|
| DE | 20 2006 002434 U1 | 4/2006 |
| EP | 1 081 423 A1 | 3/2001 |
| EP | 1 219 883 A2 | 7/2002 |
| EP | 2 085 673 A1 | 8/2009 |
| EP | 2 336 625 A2 | 6/2011 |
| JP | 2011-089564 A | 5/2011 |

* cited by examiner

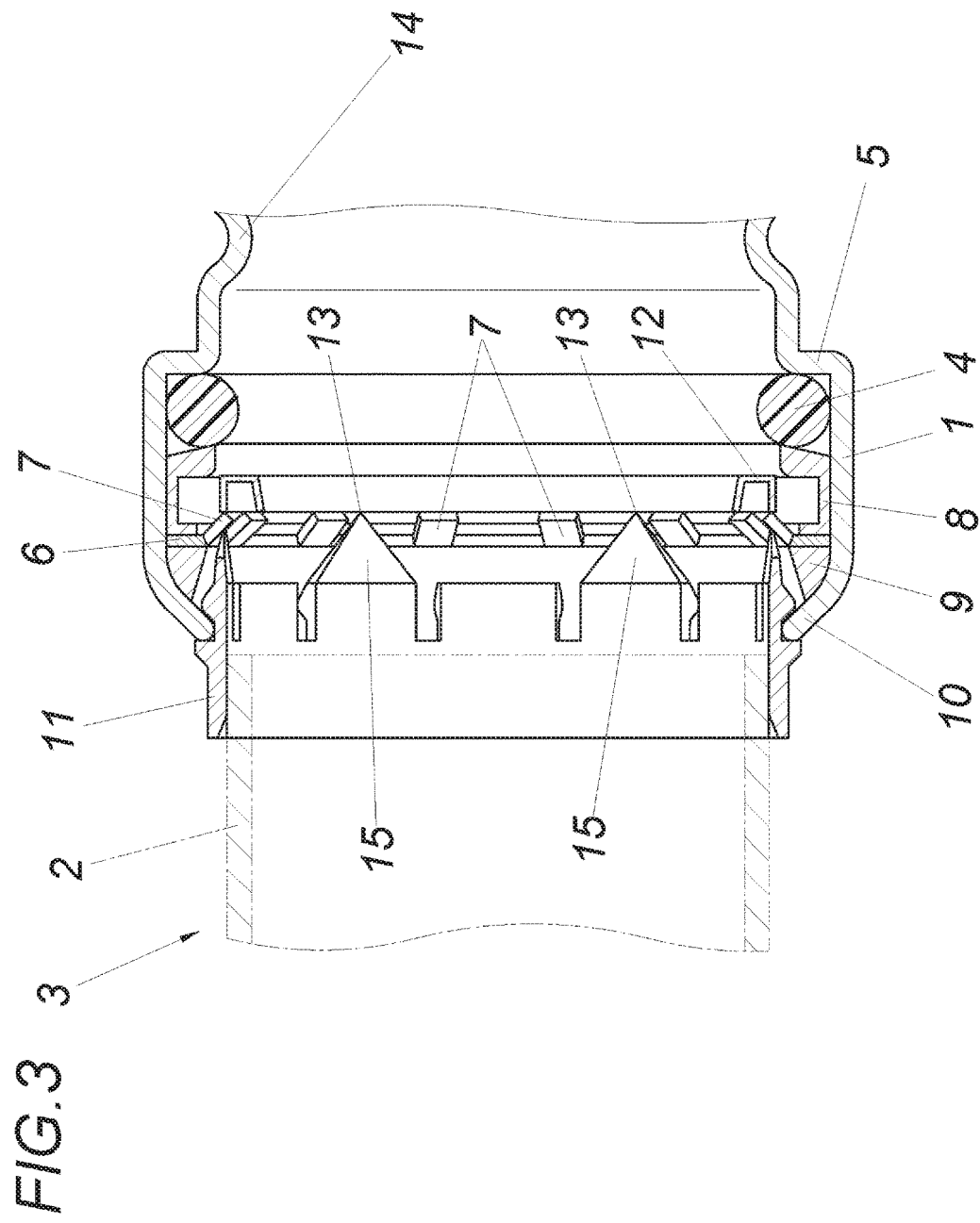

US 9,857,009 B2

PLUG-IN COUPLING FOR A PIPE, IN PARTICULAR FOR WATER CONDUITS

CROSS REFERENCE TO RELATED APPLICATIONS

This application is the National Stage of PCT/AT2013/050177 filed on Sep. 9, 2013, which claims priority under 35 U.S.C. §119 of Austrian Application No. A 50371/2012 filed on Sep. 10, 2012, the disclosure of which is incorporated by reference. The international application under PCT article 21(2) was not published in English.

FIELD OF THE INVENTION

The invention relates to a plug-in coupling for a pipe, especially for water conduits, comprising a coupling sleeve receiving the pipe end, a sealing ring which is inserted into the coupling sleeve, a locking ring which is mounted upstream of the sealing ring in the plug-in direction of the pipe end and forms retaining claws which protrude with respect to the pipe end and are inclined in the plug-in direction, and an annular body which is similarly mounted upstream of the sealing ring and is supported axially in the plug-in direction in relation to the coupling sleeve.

DESCRIPTION OF THE PRIOR ART

In order to simply provide a plug-in coupling for a pipe connection, it is known (EP 2 336 625 A2) to provide a locking ring in a coupling sleeve accommodating the inserted pipe end by interposing a sealing ring, which locking ring comprises retaining claws which protrude against the pipe end and are inclined in the plug-in direction and which become skewed on the outside jacket of the pipe end following an attempt to pull the pipe end out of the coupling sleeve and thus build up a respective resistance against extraction of the pipe end from the coupling sleeve. As a result of the selected inclination, the retaining claws are subjected to a torque in the opposite direction of the inclination in the case of loading the pipe in the direction of extraction, which torque ensures an increase in the pressing pressure of the retaining claws arranged with sharp edges on the outside jacket of the pipe end and thus secure automatic interlocking with increasing pulling forces. The precondition for this is a respective support of the locking ring in the axial direction. This axial support can advantageously occur by way of a spacer ring. In addition, an annular body can be provided as an insertion aid for the pipe end.

Since it can be expected on construction sites that the pipe ends to be connected are not processed properly during or after cutting to size, there is a likelihood that during the insertion of the pipe end into the coupling sleeve the sealing ring arranged downstream of the locking ring is damaged by the face end of the pipe end.

In order to eliminate the likelihood of damage to the sealing ring, it is known in a plug-in connection with a connecting nipple for pushing on the pipe to be connected and a sleeve enclosing the inserted pipe (EP 1 219 883 A2) to provide an axially displaceable protective ring on the connecting nipple accommodating the sealing ring, which protective ring covers the sealing ring and comprises a radially outwardly protruding driver lug on the face end situated at the rear in the plug-in direction, so that when the pipe end is slid onto the connecting nipple the face end of the pipe end slides along the protective ring over the sealing ring until the face end of the pipe end strikes the driver limit stop. The protective ring is then entrained by the pipe end and subsequently axially drawn off the sealing ring with the effect that the sealing ring seals the annular gap between the connecting nipple and the inserted pipe end. Apart from the fact that such a protective ring leads to a considerably increased constructional effort in a plug-coupling with a coupling sleeve accommodating the inserted pipe end, there are difficulties in respect of available space for the arrangement of a protective ring in plug-in couplings of this kind.

It is further known for the protection of the sealing ring of a press connection between a pressing sleeve and the pipe end (EP 1 081 423 A1) to insert a protective sleeve on the pipe end, which protective sleeve engages beyond the face end of the pipe end with an inwardly facing flange and forms an outer flange on the opposite end which rests on the face end of the insertion end of the pressing sleeve. Said protective sleeve is provided with a predetermined breaking point between the two flanges, so that during the insertion of the pipe end into the pressing sleeve the protective sleeve fractures in the region of the sealing ring and the sealing ring is pressed against the uncovered pipe end during compression of the pressing sleeve. Apart from the fact that the axial securing of the pipe end by a frictionally engaged press connection with a pipe retainer via a locking ring provided with retaining claws provides constructional conditions that are not comparable, the protective sleeve must be placed on the pipe end, which makes handling more difficult and requires an additional loose constructional part.

SUMMARY OF THE INVENTION

The invention is thus based on the object of providing a plug-in coupling of the kind mentioned above in such a way that under simple handling and constructional conditions the likelihood of damage to the sealing ring by the face end of the pipe to be connected can be excluded.

This object is achieved by the invention in such a way that the annular body comprises a protective ring for surrounding the face end of the pipe end from the outside, which protective ring is connected via a predetermined breaking connection.

A considerable constructional simplification is achieved at first by connecting the protective ring to an annular body that is already present, because no additional constructional part is required. As a result, the otherwise existing problem concerning lack of space is thus also advantageously solved because the combination of the protective ring with the already provided annular body allows minimising the required space. The connection of the protective ring to the annular body by a predetermined breaking connection not only ensures the entrainment of the protective ring when the face end of the pipe end is inserted into the coupling sleeve and severs the protective ring from the annular body once the protective ring enclosing the face end is entrained by the pipe end in the axial direction, but it also simplifies handling because the protective ring does not form any loose component and accordingly the coupling sleeve is assigned to an installation position which is constructionally predetermined. The protective ring enclosing the face end of the pipe end from the outside thus forms a driver limit stop, which after the severing of the protective ring from the annular body ensures that the protective ring enclosing the face end and the subsequent outer edge of the pipe end covers the sealing ring relative to the pipe end when the face end of the pipe end is moved past the sealing ring, so that the pipe end is unable to damage the sealing ring with its face end region. The protective ring is drawn off the sealing ring again by the displacement of the pipe end to an insertion position which is usually limited by a limit stop, which sealing ring can then rest in a sealing fashion under respective pretensioning on the outside jacket of the pipe end.

For the entrainment of the protective ring and for the protection of the sealing ring it is merely necessary to provide engagement around the face end of the pipe end by the protective ring. The entrainment of the protective ring by the pipe end is improved however if the protective ring has a U-shaped cross-section, which leads to the consequence that the protective ring engages beyond the face end of the pipe end on the outside and inside.

As already mentioned above, an annular body which is already present is used in order to hold the protective ring via a predetermined breaking connection in a catch position which is advantageous for the insertion of the pipe end into the coupling sleeve, in which the face end of the pipe end is adjacent to the protective ring. The annular body can form a spacer ring for the locking ring. It is also possible that the annular body comprising the protective ring represents an insertion aid for the pipe end. The protective ring can be positioned via the annular body in the plug-in direction both before and after the locking ring. If the protective ring for the face end of the pipe end is provided between the locking ring and the sealing ring, the protective ring need not be displaced via the sharp-edged retaining claws of the locking ring. The protective ring can also be carried by an annular body which is situated upstream of the locking ring in the plug-in direction when the retaining claws of the locking ring protrude through respective passage openings in the region of the connecting section between the annular body situated upstream of the locking ring and the protective ring situated downstream of the locking ring.

If an axial limit stop is provided for the pipe end to be inserted into the coupling sleeve, which axial stop limits the insertion depth, notice must be taken that the axial distance of the limit stop from the sealing ring is greater than the axial height of the protective ring on the outside of the pipe end, so that the protective ring is pulled off completely from the sealing ring in the limit stop position of the pipe end.

BRIEF DESCRIPTION OF THE DRAWINGS

The subject matter of the invention is shown by way of example in the drawings, wherein:

FIG. 3 shows an illustration corresponding to FIG. 1 of an embodiment of a plug-in coupling in accordance with the invention.

DESCRIPTION OF THE PREFERRED EMBODIMENT

Figure 1:
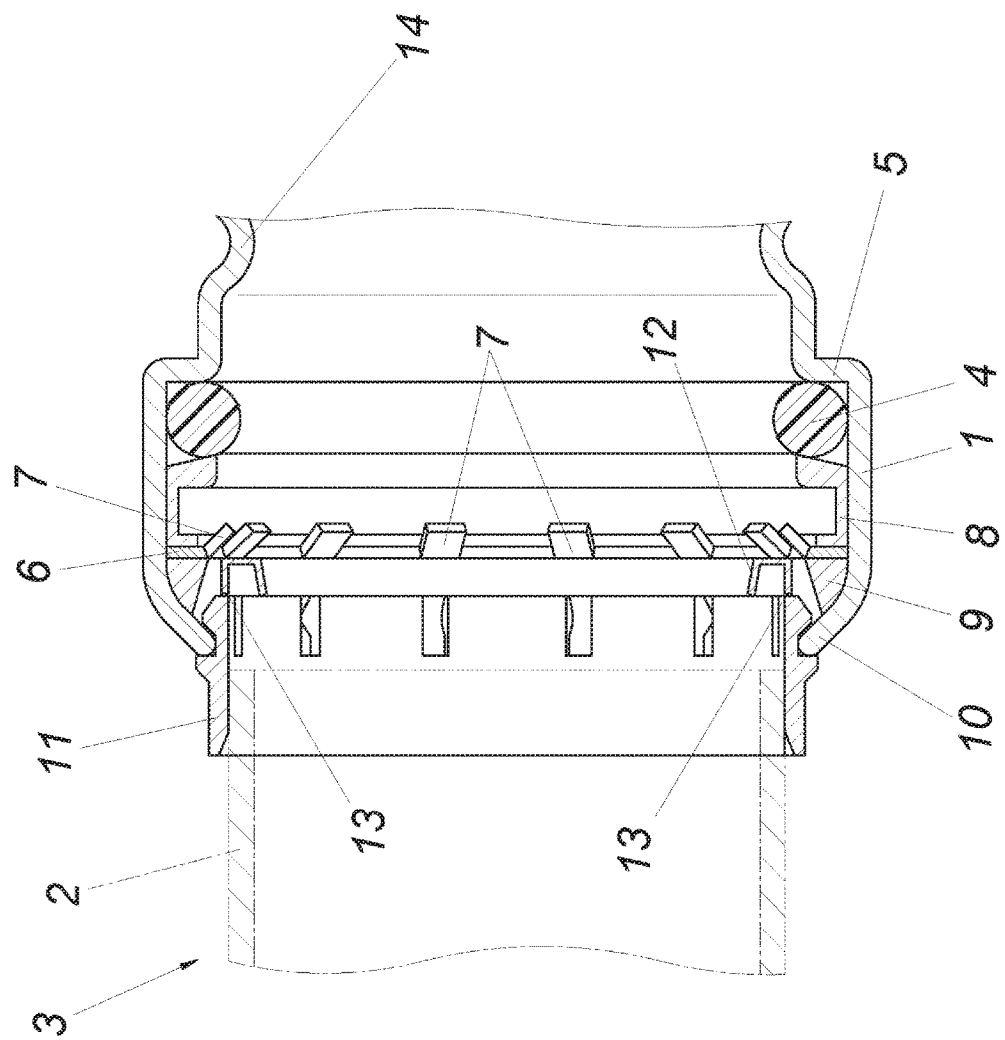
FIG. 1 shows a simplified axial sectional view of a plug-in coupling in accordance with the invention before the insertion of a pipe to be connected.
Figure 2:
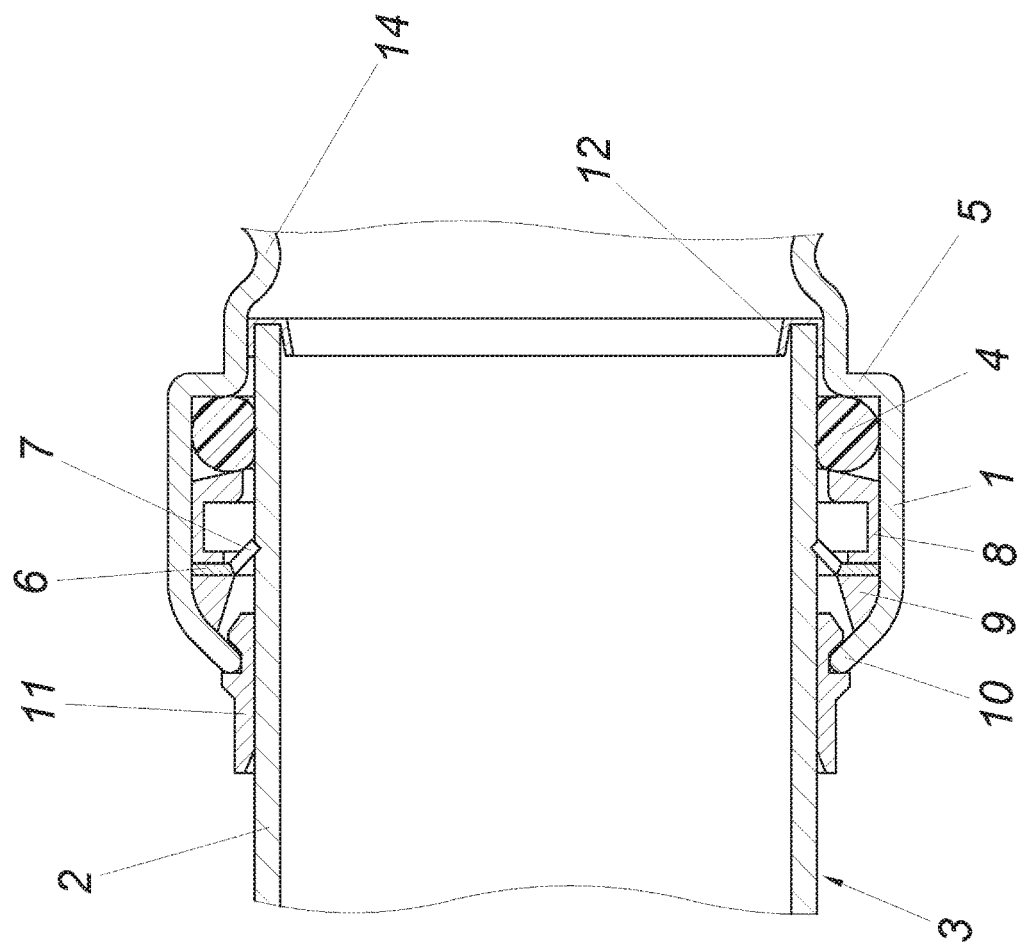
FIG. 2 shows an illustration of this plug-in coupling corresponding to the illustration of FIG. 1 after the insertion of the pipe end into the coupling sleeve.

The plug-in coupling in accordance with the embodiment according to FIGS. 1 and 2 comprises a coupling sleeve 1, into which the pipe end 2 of a pipe to be connected can be inserted. The sealing between the coupling sleeve 1 and the outer jacket of the pipe end 2 occurs by way of a sealing ring 4 which rests on a shoulder 5 of the coupling sleeve 1 in the plug-in direction. The pipe end 2 inserted into the coupling sleeve 1 is axially retained against extraction from the coupling sleeve 1 by means of a locking ring 6 upstream of the sealing ring 4. The locking ring 6 comprises retaining claws 7 for this purpose, which extend in an inclined fashion in the plug-in direction and rest resiliently with their sharp-edged face ends on the outer jacket of the pipe end 2, so that the retaining claws 7 axially retain the pipe end 2 under automatic interlocking when an attempt is made to pull the pipe end 2 from the coupling sleeve 1. The axial support of the locking ring 6 occurs by way of the spacer rings 8 and 9, wherein the spacer ring between the sealing ring 4 and the locking ring 6 secures the position of the sealing ring 4 relative to the locking ring 6, while the spacer ring 9 assumes the axial support of the locking ring 6 relative to the coupling sleeve 1. The coupling sleeve 1 comprises an indented edge 10 for this purpose, which is flanged after the insertion of the sealing ring 4 and the locking ring 6 with the spacer rings 8 and 9. For the purpose of simpler insertion of the pipe end 2 into the coupling sleeve 1, a sleeve-like insertion aid 11 is provided in the insertion opening formed by the indented edge 10 of the coupling sleeve 1.

If the pipe end 2 is inserted into the coupling sleeve 1 for the connection of a pipe 3, there is a likelihood especially in cases where the face end of the pipe end of a pipe 3 made of metal in particular was not machined accordingly that the pipe end 2 will damage the sealing ring 4 with its face end. In order to eliminate such a likelihood of damage, a protective ring 12 is provided which externally encloses the face end of the pipe end 2 and therefore covers the sealing ring 4 in relation to the face end of the pipe end when the pipe end 2 with the inserted protective ring 12 is guided beyond the sealing ring 4.

In order to ensure that the protective ring 12, which advantageously comprises a U-shaped cross-section that is not mandatory, can be held in a position constructionally provided for receiving the face end of the pipe end 2, the protective ring 12 is connected via a predetermined breaking connection 13 to the sleeve-like insertion aid 11. Said predetermined breaking connection 13 can be released in different constructional ways and is provided with the task to release the protective ring 12 once the protective ring 12 is accordingly impacted via the striking face end of the pipe end 2 in the axial direction, so that the protective ring 12 is entrained with the pipe end 2 and is guided beyond the sealing ring 4 until the face end of the pipe end 2 according to FIG. 2 strikes a limit stop formed by a constriction 14 of the coupling sleeve 1. The protective ring 12 drawn over the sealing ring 4 does not obstruct sealing between the pipe end 2 and the coupling sleeve 1 because the sealing ring 4 rests directly on the outer jacket of the pipe end 2 once the protective ring 12 is moved past the same.

In accordance with the embodiment according to FIGS. 1 and 2, the protective ring 12 is situated before the locking ring 6 in the plug-in direction. The protective ring 12 must therefore also be guided beyond the retaining claws 7 of the locking ring 6 during the insertion of a pipe end 2 into the coupling sleeve 1. If this situation is to be avoided, the protective ring 12 can also come to lie between the locking ring 6 and the sealing ring 4. The protective ring 12 can be associated with the spacer ring 8 for this purpose via a predetermined breaking connection. In accordance with FIG. 3, the sleeve-like insertion aid 11 also carries the protective ring 12 provided between the locking ring 6 and the sealing ring 4, wherein the sleeve-like insertion aid 11 forms fingers 15 engaging between the retaining claws 7 of the locking ring 6 for retaining the protective ring 12. In the case of such an embodiment, the protective ring 12 with the fingers 15 must be arranged in a sufficiently elastic fashion in order to enable the insertion past the retaining claws 7 during the mounting of the sleeve-like insertion aid. A slotted protective ring 12 can be provided for this purpose.

The invention claimed is:

1. A plug-in coupling for a pipe, the plug-in coupling comprising:
   a coupling sleeve receiving a pipe end of a pipe,
   a sealing ring inserted into the coupling sleeve,
   a locking ring mounted upstream of the sealing ring in a plug-in direction of the pipe end and comprising retaining claws, the retaining claws protruding with respect to the pipe end and being inclined in the plug-in direction, and
   an annular body similarly mounted upstream of the sealing ring and supported axially in the plug-in direction in relation to the coupling sleeve, wherein the annular body comprises a first annular body part and a protective ring for surrounding a face end of the pipe end from the outside, and wherein the protective ring is connected to the first annular body part via a predetermined breaking connection, the predetermined breaking connection releasing the protective ring when pressure is exerted in the plug-in direction.

2. The plug-in coupling according to claim 1, wherein the protective ring has a U-shaped cross-section.

3. The plug-in coupling according to claim 1, wherein the annular body forms a spacer ring for the locking ring.

4. The plug-in coupling according to claim 1, wherein the first annular body part is an insertion aid for the pipe end.

5. The plug-in coupling according to claim 1, wherein the protective ring is provided between the locking ring and the sealing ring.

6. The plug-in coupling according to claim 1, wherein the coupling sleeve for the pipe end comprises an axial stop which has an axial distance from the sealing ring greater than an axial height of the protective ring.

* * * * *